Patented Jan. 30, 1940

2,188,481

UNITED STATES PATENT OFFICE 2,188,481

FOOD COMPOSITION

Theodore John Otterbacher, Zion, Ill., assignor, by mesne assignments, to Corn Products Refining Company, New York, N. Y., a corporation of New Jersey No Drawing. Application December 24, 1937, Serial No. 181,611

2 Claims. (Cl. 99—92)

This invention relates to the production of a food composition and, more particularly, to a biscuit made from the so-called honey dough.

Honey dough is characterized by the fact that all or a large proportion of the sugars are of the honey or invert type. Honey, invert syrup, and molasses, alone or in combination, are generally employed as the syrup phase.

Honey dough is ordinarily machined either on a "sheeter" or on a wire cut machine.

With the sheeter the dough is placed in a hopper and extruded therefrom by the action of double rolls. The thick sheet is then carried by an apron through one or more sets of gauging rolls to reduce the sheet to proper thickness for the type of cutter used. Honey dough is often allowed to "age" from a few hours to over night, before being run on the sheeter, in order that the stickiness may be reduced. Even after such ageing large amounts of dusting flour must be used to prevent the dough sheet from sticking to the rolls and in the cutter cups.

With the wire cut machine the dough is extruded through a small opening of proper shape in a plate by means of pressure exerted by a pair of rolls. The correct amount of dough for each biscuit is then cut off by a wire passing through the extruded dough. The severed piece of dough then falls upon the pan and is ready for the oven.

In my copending application Serial No. 181,608 filed of even date herewith is disclosed the expedient of increasing the water content of certain types of dough without increasing the stickiness thereof by substituting dextrose hydrate for all or a part of the sucrose. I have found that the same expedient, if applied to honey dough, will not only decrease the stickiness of the dough but will render possible the control of an objectionable feature peculiar to biscuits made from honey dough, namely, hygroscopicity.

After honey biscuits are baked they are extremely hygroscopic. This is a decided disadvantage, particularly in humid weather when honey biscuits may become saturated with moisture and thereby softened to such a degree as to lose shape and stick together in one mass.

By replacing part of the invert sugars by relatively non-hygroscopic dextrose hydrate it is possible to overcome this objectionable feature without destroying the desired honey texture of biscuits of this type.

The replacement may be in varying quantities and the proportions of the various ingredients may likewise be varied without departing from the spirit of the present invention. The following example, which is solely by way of illustration, and is not to be construed as limiting the invention to the data set forth, will serve as a guide to the successful practice of the invention.

Example

| | Parts |
|---|---|
| Flour | 200 |
| Syrup | 135 |
| Shortening | 15 |
| Eggs | 16 |
| Soda | 24 |
| Salt | 2 |
| Water or milk | 30 |

The syrup consists of honey, invert sugar, molasses, and dextrose hydrate in amounts variable to suit the degree of hygroscopicity desired. Preferably the dextrose hydrate content under normal humidity conditions (40–50°) should be at least 30 parts, preferably 35–45 or, in other words, from 25%–33% of the syrup or sugar phase.

Mix all the ingredients except the flour, then add the flour and mix until clear.

The resulting dough is suitable for machining on the sheeter and the honey biscuit will be only slightly hygroscopic.

For wire cut honey dough the water content must be increased to 40–50 parts.

It is the intention to cover all modifications within the scope of the appended claims.

I claim:

1. Method of making honey biscuits which comprises compounding a dough consisting of substantially 200 parts flour, 15 parts shortening, 16 parts eggs, 24 parts soda, 2 parts salt, 30 parts liquid phase and 135 parts syrup, the syrup phase containing, in addition to invert type sugars, substantially 30–45 parts of dextrose hydrate.

2. The method of making honey dough biscuits, the improvement which consists in utilizing dextrose hydrate as 25%–33% of the sugar phase of the dough whereby the stickiness of the dough and the hygroscopicity of the finished biscuit are both decreased without impairing the characteristic honey texture of the biscuits.

THEODORE J. OTTERBACHER.